(12) United States Patent
Liu et al.

(10) Patent No.: US 11,455,783 B2
(45) Date of Patent: Sep. 27, 2022

(54) IMAGE RECOGNITION METHOD AND APPARATUS, DEVICE AND NON-VOLATILE COMPUTER STORAGE MEDIUM

(71) Applicant: BAIDU ONLINE NETWORK TECHNOLOGY (BEIJING) CO., LTD., Beijing (CN)

(72) Inventors: Guoyi Liu, Beijing (CN); Guang Li, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 133 days.

(21) Appl. No.: 16/080,945

(22) PCT Filed: May 23, 2016

(86) PCT No.: PCT/CN2016/082969
§ 371 (c)(1),
(2) Date: Aug. 29, 2018

(87) PCT Pub. No.: WO2017/156864
PCT Pub. Date: Sep. 21, 2017

(65) Prior Publication Data
US 2019/0080195 A1 Mar. 14, 2019

(30) Foreign Application Priority Data
Mar. 14, 2016 (CN) .......................... 201610143523.0

(51) Int. Cl.
*G06K 9/00* (2022.01)
*G06V 10/25* (2022.01)
(Continued)

(52) U.S. Cl.
CPC ............ *G06V 10/25* (2022.01); *G06F 16/583* (2019.01); *G06K 9/6255* (2013.01);
(Continued)

(58) Field of Classification Search
None
See application file for complete search history.

(56) References Cited

U.S. PATENT DOCUMENTS

| | | | |
|---|---|---|---|
| 9,378,604 B1 * | 6/2016 | Rathjen | G07D 3/14 |
| 2004/0213448 A1 * | 10/2004 | Jou | G07D 7/12 |
| | | | 382/156 |

(Continued)

FOREIGN PATENT DOCUMENTS

| | | |
|---|---|---|
| CN | 101299239 A | 11/2008 |
| CN | 102375987 A | 3/2012 |

(Continued)

OTHER PUBLICATIONS

Chinese Office Action dated Jan. 20, 2017, for related Chinese Appln. No. 201610143523.0; 4 Pages.

(Continued)

*Primary Examiner* — Sean M Conner
(74) *Attorney, Agent, or Firm* — Brooks Kushman P.C.

(57) ABSTRACT

The present disclosure provides an image recognition method and apparatus, a device and a non-volatile computer storage medium. In embodiments of the present disclosure, it is feasible to obtain the to-be-recognized image of a designated size, extract the different-area image from the to-be-recognized image, and obtain the image feature of the different-area image according to the different-area image, so as to obtain the recognition result of the to-be-recognized image, according to the image feature of the different-area image and a preset template feature. In this way, recognition processing can be performed for images in a limited number of classes without employing the deep learning method based on hundreds of thousands of even millions of training samples.

3 Claims, 2 Drawing Sheets

(51) Int. Cl.
*G06K 9/62* (2022.01)
*G06F 16/583* (2019.01)
*G06T 3/00* (2006.01)

(52) U.S. Cl.
CPC ......... *G06K 9/6256* (2013.01); *G06K 9/6274* (2013.01); *G06T 3/0006* (2013.01); *G06V 2201/09* (2022.01)

(56) References Cited

U.S. PATENT DOCUMENTS

| | | | | |
|---|---|---|---|---|
| 2009/0043536 | A1* | 2/2009 | Balderer | G06K 9/622 |
| | | | | 702/179 |
| 2010/0042843 | A1* | 2/2010 | Brunk | H04N 1/3216 |
| | | | | 713/176 |
| 2011/0216179 | A1* | 9/2011 | Dialameh | G06V 20/10 |
| | | | | 348/E7.085 |
| 2012/0301009 | A1* | 11/2012 | Dabic | G07D 3/14 |
| | | | | 382/136 |
| 2014/0098209 | A1* | 4/2014 | Neff | A61B 5/742 |
| | | | | 348/77 |
| 2015/0036919 | A1* | 2/2015 | Bourdev | G06N 20/00 |
| | | | | 382/156 |
| 2016/0187261 | A1* | 6/2016 | Hager | G01N 21/8803 |
| | | | | 356/237.2 |
| 2018/0174308 | A1* | 6/2018 | Ijiri | G06K 9/6202 |

FOREIGN PATENT DOCUMENTS

| | | | |
|---|---|---|---|
| CN | 102486868 | A | 6/2012 |
| CN | 103810488 | A | 5/2014 |
| CN | 103927511 | A | 7/2014 |
| CN | 104636726 | A | 5/2015 |
| CN | 104751108 | A | 7/2015 |
| CN | 105320945 | A | 2/2016 |

OTHER PUBLICATIONS

Chinese Search Report retrieved May 20,2020 for related Chinese Appln. No. 201610143523.0; 1 Page.
Chinese Office Action dated Jun. 26, 2017, for related Chinese Appln. No. 201610143523.0; 5 Pages.
Chinese Office Action dated Oct. 26, 2017, for related Chinese Appln. No. 201610143523.0; 5 Pages.
PCT Search Report dated Dec. 8, 2016 for related PCT Appln. No. PCT/CN2016/082969; 11 Pages.

* cited by examiner

IMAGE RECOGNITION METHOD AND APPARATUS, DEVICE AND NON-VOLATILE COMPUTER STORAGE MEDIUM

CROSS-REFERENCE TO RELATED APPLICATIONS

This application is the U.S. national phase of PCT Application No. PCT/CN2016/082969 filed on May 23, 2016, which claims priority to Chinese Patent Application No. 201610143523.0 filed on Mar. 14, 2016, the disclosures of which are incorporated in their entirety by reference herein.

FIELD OF THE DISCLOSURE

The present disclosure relates to image processing technologies, and particularly to an image recognition method and apparatus, a device and a non-volatile computer storage medium.

BACKGROUND OF THE DISCLOSURE

In recent years, use of a deep learning method achieves excellent results in the field of image recognition. The deep learning has high requirements for the number of training samples, and it usually requires hundreds of thousands of even millions of training samples.

However, in the case of a limited number of classes of images, the number of training samples is also very limited, and it is improper to employ the deep learning method to perform recognition processing for the images in the limited number of classes. Hence, it is desirable to provide an image recognition method to perform recognition processing for the images in the limited number of classes.

SUMMARY OF THE DISCLOSURE

A plurality of aspects of the present disclosure provide an image recognition method and apparatus, a device and a non-volatile computer storage medium, to perform recognition processing for images in a limited number of classes.

According to an aspect of the present disclosure, there is provided an image recognition method, comprising:
 obtaining a to-be-recognized image of a designated size;
 extracting a different-area image from the to-be-recognized image;
 obtaining an image feature of the different-area image according to the different-area image;
 obtaining a recognition result of the to-be-recognized image, according to the image feature of the different-area image and a preset template feature.

The above aspect and any possible implementation mode further provide an implementation mode: the obtaining a to-be-recognized image of a designated size comprises:
 using affine transform to adjust the obtained to-be-recognized image of any size as the to-be-recognized image of the designated size.

The above aspect and any possible implementation mode further provide an implementation mode: the extracting a different-area image from the to-be-recognized image comprises:
 extracting the different-area image from the to-be-recognized image, according to a pre-designated area location.

The above aspect and any possible implementation mode further provide an implementation mode: the obtaining an image feature of the different-area image according to the different-area image comprises:
 obtaining an image feature of the different-area image by using a model obtained by training from a general data set, according to the different-area image.

The above aspect and any possible implementation mode further provide an implementation mode: before obtaining a recognition result of the to-be-recognized image, according to the image feature of the different-area image and a preset template feature, the method further comprises:
 obtaining template images of at least two designated classes;
 extracting a template area image of each designated class from the template image of said each designated class in the at least two designated classes; and
 obtaining a template feature of said each designated class according to the template area image of said each designated class.

According to another aspect of the present disclosure, there is provided an image recognition apparatus, comprising:
 an obtaining unit configured to obtain a to-be-recognized image of a designated size;
 an extracting unit configured to extract a different-area image from the to-be-recognized image;
 a feature unit configured to obtain an image feature of the different-area image according to the different-area image;
 a recognition unit configured to obtain a recognition result of the to-be-recognized image, according to the image feature of the different-area image and a preset template feature.

The above aspect and any possible implementation mode further provide an implementation mode: the obtaining unit is specifically configured to
 use affine transform to adjust the obtained to-be-recognized image of any size as the to-be-recognized image of the designated size.

The above aspect and any possible implementation mode further provide an implementation mode: the extracting unit is specifically configured to
 extract the different-area image from the to-be-recognized image, according to a pre-designated area location.

The above aspect and any possible implementation mode further provide an implementation mode: the feature unit is specifically configured to
 obtain an image feature of the different-area image by using a model obtained by training from a general data set, according to the different-area image.

The above aspect and any possible implementation mode further provide an implementation mode: the feature unit is further configured to
 obtain template images of at least two designated classes;
 extract a template area image of each designated class from the template image of said each designated class in the at least two designated classes; and
 obtain a template feature of said each designated class according to the template area image of said each designated class.

According to a further aspect of the present disclosure, there is provided a device, comprising
 one or more processor;
 a memory;
 one or more programs stored in the memory and configured to execute the following operations when executed by the one or more processors:
 obtaining a to-be-recognized image of a designated size;
 extracting a different-area image from the to-be-recognized image;

obtaining an image feature of the different-area image according to the different-area image;

obtaining a recognition result of the to-be-recognized image, according to the image feature of the different-area image and a preset template feature.

According to a further aspect of the present disclosure, there is provided a non-volatile computer storage medium in which one or more programs are stored, an apparatus being enabled to execute the following operations when said one or more programs are executed by the apparatus:

obtaining a to-be-recognized image of a designated size;

extracting a different-area image from the to-be-recognized image;

obtaining an image feature of the different-area image according to the different-area image;

obtaining a recognition result of the to-be-recognized image, according to the image feature of the different-area image and a preset template feature.

As known from the above technical solutions, in embodiments of the present disclosure, it is feasible to obtain the to-be-recognized image of a designated size, extract the different-area image from the to-be-recognized image, and obtain the image feature of the different-area image according to the different-area image, so as to obtain the recognition result of the to-be-recognized image, according to the image feature of the different-area image and a preset template feature. In this way, recognition processing can be performed for images in a limited number of classes without employing the deep learning method based on hundreds of thousands of even millions of training samples.

In addition, the technical solutions provided by the present disclosure do not require purposefully collecting large-scale training samples and using the deep learning method to train these training samples to obtain the model. Instead, the technical solutions provided by the present disclosure may use the model obtained by training from the general data set, thereby removing the workload of performing data collection in collecting the training samples on a large scale and training the model, and effectively quickening the algorithm development time of the image recognition processing.

In addition, according to the technical solutions provided by the present disclosure, the accuracy of image recognition processing can be ensured effectively by manually pre-designating the area location having a larger differentiation.

BRIEF DESCRIPTION OF DRAWINGS

To describe technical solutions of embodiments of the present disclosure more clearly, figures to be used in the embodiments or in depictions regarding the prior art will be described briefly. Obviously, the figures described below are only some embodiments of the present disclosure. Those having ordinary skill in the art appreciate that other figures may be obtained from these figures without making inventive efforts.

DETAILED DESCRIPTION OF PREFERRED EMBODIMENTS

To make objectives, technical solutions and advantages of embodiments of the present disclosure clearer, technical solutions of embodiment of the present disclosure will be described clearly and completely with reference to figures in embodiments of the present disclosure. Obviously, embodiments described here are partial embodiments of the present disclosure, not all embodiments. All other embodiments obtained by those having ordinary skill in the art based on the embodiments of the present disclosure, without making any inventive efforts, fall within the protection scope of the present disclosure.

It needs to be appreciated that the terminals involved in the embodiments of the present disclosure comprise but are not limited to a mobile phone, a Personal Digital Assistant (PDA), a wireless handheld device, a tablet computer, a Personal Computer (PC), an MP3 player, an MP4 player, and a wearable device (e.g., a pair of smart glasses, a smart watch, or a smart bracelet).

In addition, the term "and/or" used in the text is only an association relationship depicting associated objects and represents that three relations might exist, for example, A and/or B may represents three cases, namely, A exists individually, both A and B coexist, and B exists individually. In addition, the symbol "/" in the text generally indicates associated objects before and after the symbol are in an "or" relationship.

Figure 1:
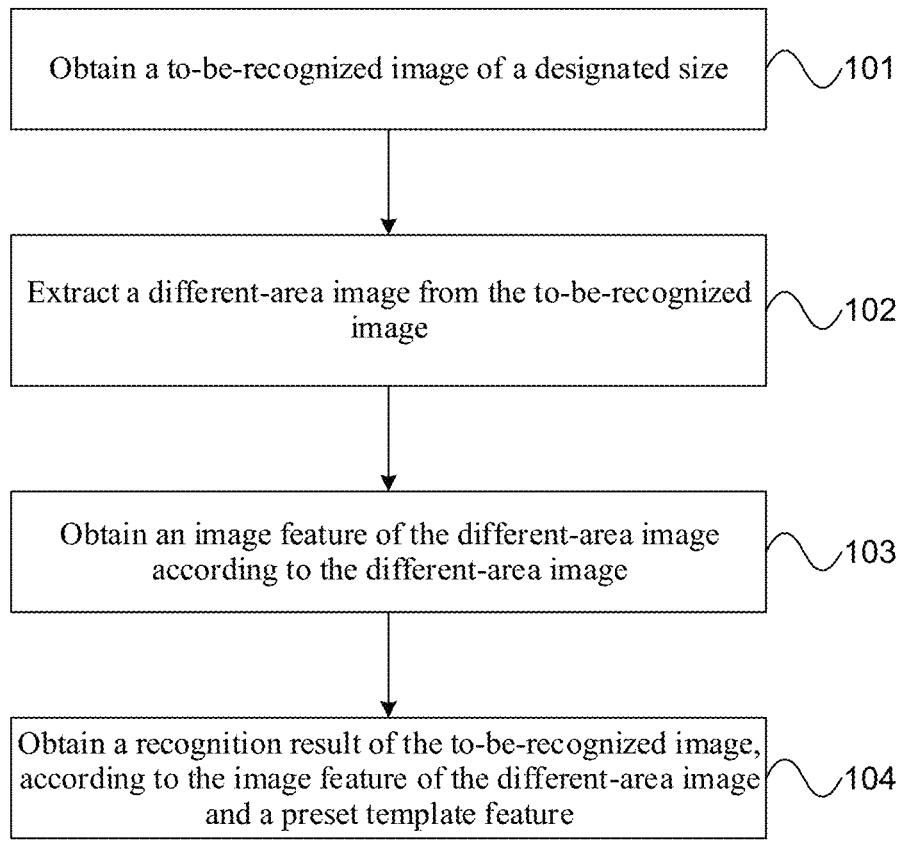
FIG. 1 is a flow chart of an image recognition method according to an embodiment of the present disclosure.

FIG. 1 is a flow chart of an image recognition method according to an embodiment of the present disclosure. As shown in FIG. 1, the method comprises the following steps:

101: obtaining a to-be-recognized image of a designated size.

The so-called image refers to a file formed by employing a certain image format and storing image data, namely image pixels, in a certain manner, and may also be called an image file.

The image format of the image, namely, a format in which the image is stored, may include but not limited to: Bitmap (BMP) format, Portable Network Graphic Format (PNG), Joint Photographic Experts Group (JPEG) format, and Exchangeable Image File Format (EXIF). This is not particularly defined in the present embodiment.

102: extracting a different-area image from the to-be-recognized image.

103: obtaining an image feature of the different-area image according to the different-area image.

104: obtaining a recognition result of the to-be-recognized image, according to the image feature of the different-area image and a preset template feature.

It needs to be appreciated that a subject for executing 101-104 may be an application located at a local terminal, or a function unit such as a plug-in or Software Development Kit (SDK) arranged in the application located at the local terminal, or a processing engine located in a network-side server, or a distributed type system located on the network side. This is not particularly limited in the present embodiment.

It may be understood that the application may be a native application (nativeAPP) installed on the terminal, or a webpage program (webApp) of a browser on the terminal. This is not particularly limited in the present embodiment.

As such, it is feasible to obtain the to-be-recognized image of a designated size, extract a different-area image from the to-be-recognized image, and obtain the image feature of the different-area image according to the different-area image, so as to obtain the recognition result of the to-be-recognized image, according to the image feature of the different-area image and a preset template feature. In this way, recognition processing can be performed for images in a limited number of classes without employing the deep learning method based on hundreds of thousands of even millions of training samples.

In the present disclosure, the to-be-recognized image may be collected by using an image sensor. The image sensor may be a Charge Coupled Device (CCD) sensor, or a Complementary Metal-Oxide Semiconductor (CMOS) sensor. This is not particularly limited in the present embodiment.

In addition to a target object corresponding to the to-be-recognized image, the collected image usually further includes some other objects as background images, for example. For example, an image of a person with a sheet of Chinese paper money in hand includes the target object, namely, the sheet of Chinese paper money corresponding to the to-be-recognized image, and might further include some other objects such as the person's hand and cashier desk as background images. Hence, it is necessary to further employ a conventional image detection method, e.g., a Scale-Invariant Feature Transform (SIFT) algorithm, to find the area of the target object in the image, as the to-be-recognized image.

Optionally, in a possible implementation mode of the present embodiment, in 101, it is specifically possible to use affine transform to adjust the obtained to-be-recognized image of any size as the to-be-recognized image of the designated size.

Specifically speaking, the affine transform may be implemented by combining a series of atomic transformations, and may specifically include but not limited to at least one of translation, scale, flip, rotation and shear.

Optionally, in a possible implementation mode of the present embodiment, in 102, it is specifically feasible to extract the different-area image from the to-be-recognized image, according to a pre-designated area location.

Figure 3:
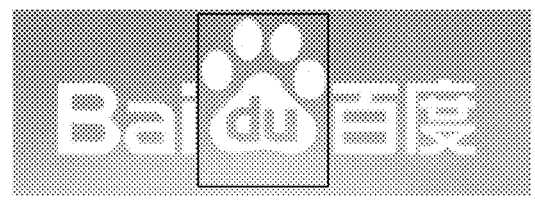
FIG. 3 is a schematic diagram of a different-area image in the embodiment corresponding to FIG. 1.

In a specific implementation, before 102, it is feasible to further manually pre-designate an area location having a larger differentiation. As shown by a solid-line box shown in FIG. 3, the area location may be calibrated by employing various geometrical shapes.

For example, the area location may be calibrated with a location of a rectangular box, namely, a left upper corner (x1, y1), and a right lower corner (x2, y2). To facilitate calculation, proportion may be employed to describe the left upper corner (x1, y1) as (x1/width, y1/height), and describe the right lower corner (x2, y2) as (x2/width, y2/height), wherein width and height are an image length of a template image and an image width of the template image.

As such, the accuracy of the image recognition processing can be effectively ensured by manually pre-designating the area location having a larger differentiation.

In this implementation mode, after the area location having a larger differentiation is manually pre-designated, it is specifically feasible to position the area location from the to-be-recognized image according to the pre-designated area location, and then extract the image covered by the area location, as the different-area image.

Optionally, in a possible implementation mode of the present embodiment, in 103, it is specifically possible to obtain an image feature of the different-area image by using a model obtained by training from a general data set, according to the different-area image.

In this implementation mode, before 103, it is necessary to perform sample training with a deep learning algorithm based on the current general data set, to obtain a model, for example, a model obtained by training with a Deep Neural Network (CDNN) based on a data set disclosed by ImageNet (currently the largest data database in data recognition). Generally, the model can be obtained very easily.

Optionally, in a possible implementation mode of the present embodiment, before 104, it is feasible to further obtain template images of at least two designated classes, and then extract a template area image of each designated class from the template image of each designated class in the at least two designated classes. Then, it is feasible to obtain a template feature of said each designated class according to the template area image of the each designated class.

In this implementation mode, it is specifically to extract the template area image of the each designated class from the template image of each designated class, according to the pre-designated area location. Then, it is feasible to use the obtained model to obtain the template feature of said each designated class, according to the template area image.

Specifically, in 104, it is specifically feasible to measure a distance for the image feature of the different-area image and a preset template feature, to obtain a template feature with the nearest distance, and then regard the class of the template image to which the template feature belongs, as a recognition result.

In the present embodiment, it is feasible to obtain the to-be-recognized image of a designated size, extract the different-area image from the to-be-recognized image, and obtain the image feature of the different-area image according to the different-area image, so as to obtain the recognition result of the to-be-recognized image, according to the image feature of the different-area image and a preset template feature. In this way, recognition processing can be performed for images in a limited number of classes without employing the deep learning method based on hundreds of thousands of even millions of training samples.

In addition, the technical solution provided by the present disclosure does not require purposefully collecting large-scale training samples and using the deep learning method to train these training samples to obtain the model. Instead, the technical solution provided by the present disclosure may use the model obtained by training from the general data set, thereby removing the workload of performing data collection in collecting the training samples on a large scale and training the model, and effectively quickening the algorithm development time of the image recognition processing.

In addition, according to the technical solution provided by the present disclosure, the accuracy of image recognition processing can be ensured effectively by manually pre-designating the area location having a larger differentiation.

It needs to be appreciated that regarding the aforesaid method embodiments, for ease of description, the aforesaid method embodiments are all described as a combination of a series of actions, but those skilled in the art should appreciated that the present disclosure is not limited to the described order of actions because some steps may be performed in other orders or simultaneously according to the present disclosure. Secondly, those skilled in the art should appreciate the embodiments described in the description all belong to preferred embodiments, and the involved actions and modules are not necessarily requisite for the present disclosure.

In the above embodiments, different emphasis is placed on respective embodiments, and reference may be made to related depictions in other embodiments for portions not detailed in a certain embodiment.

Figure 2:
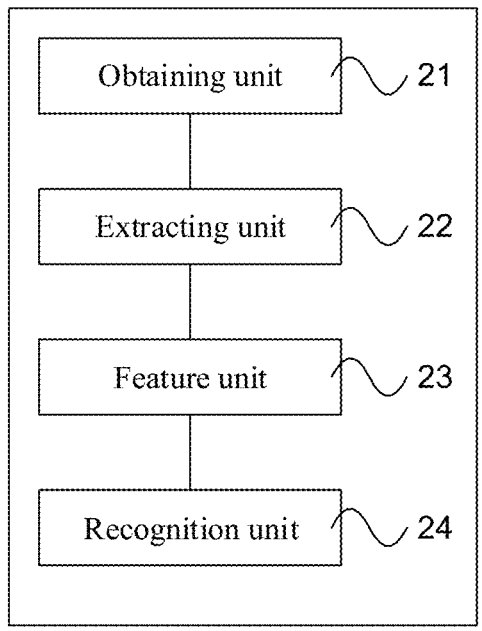
FIG. 2 is a structural schematic diagram of an image recognition apparatus according to another embodiment of the present disclosure.

FIG. 2 is a structural schematic diagram of an image recognition apparatus according to another embodiment of the present disclosure. As shown in FIG. 2, the image recognition apparatus of the present embodiment may include an obtaining unit 21, an extracting unit 22, a feature unit 23 and a recognition unit 24, wherein the obtaining unit 21 is configured to obtain a to-be-recognized image of a designated size; the extracting unit 22 is configured to extract a different-area image from the to-be-recognized image; the feature unit 23 is configured to obtain an image feature of the different-area image according to the different-area image; the recognition unit 24 is configured to obtain a recognition result of the to-be-recognized image, according to the image feature of the different-area image and a preset template feature.

It needs to be appreciated that the image recognition apparatus according to the present embodiment may be an application located at a local terminal, or a function unit such as a plug-in or Software Development Kit (SDK) arranged in the application located at the local terminal, or a processing engine located in a network-side server, or a distributed type system located on the network side. This is not particularly limited in the present embodiment.

It may be understood that the application may be a native application (nativeAPP) installed on the terminal, or a webpage program (webApp) of a browser on the terminal. This is not particularly limited in the present embodiment.

Optionally, in a possible implementation mode of the present embodiment, the obtaining unit 21 may specifically be configured to use affine transform to adjust the obtained to-be-recognized image of any size as the to-be-recognized image of the designated size.

Optionally, in a possible implementation mode of the present embodiment, the extracting unit 22 may specifically be configured to extract the different-area image from the to-be-recognized image, according to a pre-designated area location.

Optionally, in a possible implementation mode of the present embodiment, the feature unit 23 may specifically be configured to obtain an image feature of the different-area image by using a model obtained by training from a general data set, according to the different-area image.

Optionally, in a possible implementation mode of the present embodiment, the feature unit 23 may be further configured to obtain template images of at least two designated classes; extract a template area image of said each designated class from the template image of each designated class in the at least two designated classes; and obtain a template feature of said each designated class according to the template area image of said each designated class.

It needs to be appreciated that the method in the embodiment corresponding to FIG. 1 may be implemented by the image recognition apparatus provided in the present embodiment. For detailed description, please refer to relevant content in the embodiment corresponding to FIG. 1, and no detailed description will be presented any longer.

In the present embodiment, the obtaining unit obtains the to-be-recognized image of a designated size, the extracting unit extracts the different-area image from the to-be-recognized image, and the feature unit obtains the image feature of the different-area image according to the different-area image, so that the recognition unit can obtain the recognition result of the to-be-recognized image, according to the image feature of the different-area image and a preset template feature. In this way, recognition processing can be performed for images in a limited number of classes without employing the deep learning method based on hundreds of thousands of even millions of training samples.

In addition, the technical solution provided by the present disclosure does not require purposefully collecting large-scale training samples and using the deep learning method to train these training samples to obtain the model. Instead, the technical solution provided by the present disclosure may use the model obtained by training from the general data set, thereby removing the workload of performing data collection in collecting the training samples on a large scale and training the model, and effectively quickening the algorithm development time of the image recognition processing.

In addition, according to the technical solution provided by the present disclosure, the accuracy of image recognition processing can be ensured effectively by manually pre-designating the area location having a larger differentiation.

Those skilled in the art can clearly understand that for purpose of convenience and brevity of depictions, reference may be made to corresponding procedures in the aforesaid method embodiments for specific operation procedures of the system, apparatus and units described above, which will not be detailed any more.

In the embodiments provided by the present disclosure, it should be understood that the revealed system, apparatus and method can be implemented in other ways. For example, the above-described embodiments for the apparatus are only exemplary, e.g., the division of the units is merely logical one, and, in reality, they can be divided in other ways upon implementation. For example, a plurality of units or components may be combined or integrated into another system, or some features may be neglected or not executed. In addition, mutual coupling or direct coupling or communicative connection as displayed or discussed may be indirect coupling or communicative connection performed via some interfaces, means or units and may be electrical, mechanical or in other forms.

The units described as separate parts may be or may not be physically separated, the parts shown as units may be or may not be physical units, i.e., they can be located in one place, or distributed in a plurality of network units. One can select some or all the units to achieve the purpose of the embodiment according to the actual needs.

Further, in the embodiments of the present disclosure, functional units can be integrated in one processing unit, or they can be separate physical presences; or two or more units can be integrated in one unit. The integrated unit described above can be implemented in the form of hardware, or they can be implemented with hardware plus software functional units.

The aforementioned integrated unit in the form of software function units may be stored in a computer readable storage medium. The aforementioned software function units are stored in a storage medium, including several instructions to instruct a computer device (a personal computer, server, or network equipment, etc.) or processor to perform some steps of the method described in the various embodiments of the present disclosure. The aforementioned storage medium includes various media that may store program codes, such as U disk, removable hard disk, Read-Only Memory (ROM), a Random Access Memory (RAM), magnetic disk, or an optical disk.

Finally, it is appreciated that the above embodiments are only used to illustrate the technical solutions of the present disclosure, not to limit the present disclosure; although the present disclosure is described in detail with reference to the above embodiments, those having ordinary skill in the art should understand that they still can modify technical solutions recited in the aforesaid embodiments or equivalently replace partial technical features therein; these modifications or substitutions do not cause essence of corresponding technical solutions to depart from the spirit and scope of technical solutions of embodiments of the present disclosure.

What is claimed is:

1. An image recognition method, wherein the method comprises:
obtaining a to-be-recognized image of a designated size;
extracting a different-area image from the to-be-recognized image;
obtaining an image feature of the different-area image according to the different-area image; and
obtaining a recognition result of the to-be-recognized image, according to the image feature of the different-area image and a preset template feature,
wherein the extracting the different-area image from the to-be-recognized image comprises:
positioning an area location from the to-be-recognized image according to a manually pre-designated area location having a larger differentiation, the to-be-recognized image containing a target object and other objects in addition to the target object, wherein the differentiation is relative to other objects contained in the to-be-recognized image, and
then extracting, only considering the area location of the to-be-recognized image containing only the target object, the image covered by the area location as the different-area image,
wherein the extracting the different-area image from the to-be-recognized image further comprises employing a Scale-Invariant Feature Transform (SIFT) algorithm,
wherein the obtaining the to-be-recognized image of the designated size comprises: using affine transform to adjust the obtained to-be-recognized image of any size as the to-be-recognized image of the designated size,
wherein the using the affine transform comprises applying a series of atomic transformations to the obtained to-be-recognized image, the series of atomic transformations including translation, scale, flip, rotation, and shear,
wherein the obtaining the image feature of the different-area image according to the different-area image comprises: obtaining the image feature of the different-area image by using a model obtained by training a Deep Neural Network from a general data set, according to the different-area image,
wherein obtaining the recognition result of the to-be-recognized image comprises:
obtaining template images of at least two designated classes;
extracting a template area image of each designated class from the template image of said each designated class in the at least two designated classes according to the manually pre-designated area location;
measuring a distance between the image feature of the different-area image and an image feature of each of the respective template area images;
obtaining a template feature having a nearest distance among the measured distances; and
regarding the designated class corresponding to the template feature having the nearest distance as the recognition result.

2. A device, comprising
one or more processor;
a memory;
one or more programs stored in the memory and configured to execute an image recognition method, wherein the method comprises:
obtaining a to-be-recognized image of a designated size;
extracting a different-area image from the to-be-recognized image;
obtaining an image feature of the different-area image according to the different-area image; and
obtaining a recognition result of the to-be-recognized image, according to the image feature of the different-area image and a preset template feature,
wherein the extracting the different-area image from the to-be-recognized image comprises:
positioning an area location from the to-be-recognized image according to a manually pre-designated area location having a larger differentiation, the to-be-recognized image containing a target object and other objects in addition to the target object, wherein the differentiation is relative to the other objects contained in the to-be-recognized image, and
then extracting, only considering the area location of the to-be-recognized image containing only the target object, the image covered by the area location as the different-area image,
wherein the extracting the different-area image from the to-be-recognized image further comprises employing a Scale-Invariant Feature Transform (SIFT) algorithm,
wherein the obtaining the to-be-recognized image of the designated size comprises: using affine transform to adjust the obtained to-be-recognized image of any size as the to-be-recognized image of the designated size,
wherein the using the affine transform comprises applying a series of atomic transformations to the obtained to-be-recognized image, the series of atomic transformations including translation, scale, flip, rotation, and shear,
wherein the obtaining the image feature of the different-area image according to the different-area image comprises: obtaining the image feature of the different-area image by using a model obtained by training a Deep Neural Network from a general data set, according to the different-area image,
wherein obtaining the recognition result of the to-be-recognized image comprises:
obtaining template images of at least two designated classes;
extracting a template area image of each designated class from the template image of said each designated class in the at least two designated classes according to the manually pre-designated area location;
measuring a distance between the image feature of the different-area image and an image feature of each of the respective template area images;
obtaining a template feature having a nearest distance among the measured distances; and
regarding the designated class corresponding to the template feature having the nearest distance as the recognition result.

3. A non-transitory computer storage medium in which one or more programs are stored, an apparatus being enabled to execute an image recognition method, wherein the method comprises:
obtaining a to-be-recognized image of a designated size;
extracting a different-area image from the to-be-recognized image;
obtaining an image feature of the different-area image according to the different-area image; and obtaining a recognition result of the to-be-recognized image, according to the image feature of the different-area image and a preset template feature, wherein the extracting the different-area image from the to-be-recognized image comprises:

positioning an area location from the to-be-recognized image according to a manually pre-designated area location having a larger differentiation, the to-be-recognized image containing a target object and other objects in addition to the target object, wherein the differentiation is relative to other objects contained in the to-be-recognized image, and then extracting, only considering the area location of the to-be-recognized image containing only the target object, the image covered by the area location as the different-area image, wherein the extracting the different-area image from the to-be-recognized image further comprises employing a Scale-Invariant Feature Transform (SIFT) algorithm, wherein the obtaining the to-be-recognized image of the designated size comprises: using affine transform to adjust the obtained to-be-recognized image of any size as the to-be-recognized image of the designated size, wherein the using the affine transform comprises applying a series of atomic transformations to the obtained to-be-recognized image, the series of atomic transformations including translation, scale, flip, rotation, and shear, wherein the obtaining the image feature of the different-area image according to the different-area image comprises: obtaining the image feature of the different-area image by using a model obtained by training a Deep Neural Network from a general data set, according to the different-area image, wherein obtaining the recognition result of the to-be-recognized image comprises:

obtaining template images of at least two designated classes;

extracting a template area image of each designated class from the template image of said each designated class in the at least two designated classes according to the manually pre-designated area location;

measuring a distance between the image feature of the different-area image and an image feature of each of the respective template area images;

obtaining a template feature having a nearest distance among the measured distances; and regarding the designated class corresponding to the template feature having the nearest distance as the recognition result.

* * * * *